US009567159B2

(12) United States Patent

Loney et al.

(10) Patent No.: US 9,567,159 B2
(45) Date of Patent: Feb. 14, 2017

(54) METHOD AND APPARATUS FOR CONSTRUCTING STEEL GARBAGE DUMPSTERS

(71) Applicant: Triton Manufacturing, Inc., Farley, IA (US)

(72) Inventors: Bradley Loney, Marion, IA (US); Brian Loney, Cedar Rapids, IA (US); Robert Schmerbach, Dyersville, IA (US)

(73) Assignee: Triton Manufacturing, Inc., Farley, IA (US)

( * ) Notice: Subject to any disclaimer, the term of this patent is extended or adjusted under 35 U.S.C. 154(b) by 0 days.

(21) Appl. No.: 15/205,698

(22) Filed: Jul. 8, 2016

(65) Prior Publication Data

US 2017/0008699 A1 Jan. 12, 2017

Related U.S. Application Data

(60) Provisional application No. 62/191,067, filed on Jul. 10, 2015.

(51) Int. Cl.

| | |
|---|---|
| ***B23K 31/02*** | (2006.01) |
| ***B65F 1/14*** | (2006.01) |
| ***B65F 1/12*** | (2006.01) |
| ***B65F 1/02*** | (2006.01) |
| ***B23K 33/00*** | (2006.01) |

(52) U.S. Cl.

CPC ............ *B65F 1/1468* (2013.01); *B23K 33/00* (2013.01); *B65F 1/02* (2013.01); *B65F 1/122* (2013.01); *B65F 2220/101* (2013.01); *B65F 2250/112* (2013.01)

(58) Field of Classification Search

CPC ................. B23K 33/00–33/004; B65F 1/1468; B65F 1/02; B65F 1/122; B65F 2250/112; B65F 2220/101

USPC ............. 228/164–265, 135–140; 180/89.11; 220/908–909

See application file for complete search history.

(56) References Cited

U.S. PATENT DOCUMENTS

| | | | |
|---|---|---|---|
| 1,511,613 A | 10/1924 | Joern | |
| 1,818,951 A | 8/1931 | Harrall et al. | |
| 3,066,436 A | 12/1962 | Schuh | |
| 3,136,575 A | 6/1964 | Kolling | |
| 3,357,274 A | 12/1967 | Dapoz | |
| 3,420,032 A | 1/1969 | Felt | |
| 3,432,039 A | 3/1969 | Howitt | |
| 4,009,796 A | 3/1977 | Schmidt | |
| 4,020,967 A | 5/1977 | Hammond et al. | |
| 4,152,979 A * | 5/1979 | Schmidt | B30B 9/3046 100/100 |

(Continued)

FOREIGN PATENT DOCUMENTS

WO WO 2009120938 A2 * 10/2009 ................ B65F 1/02

*Primary Examiner* — Kiley Stoner

(74) *Attorney, Agent, or Firm* — Simmons Perrine Moyer Bergman PLC

(57) ABSTRACT

A method, apparatus and system is disclosed for making garbage dumpsters which includes a box comprising: a bottom panel; a back panel; a front panel; a left panel; a right panel; wherein said bottom panel; said back panel; said front panel; said left panel; and said right panel; are configured so that a last remaining one of said panels can be hung on a plurality of hooks protruding from edges of two of said panels, thereby creating a container without using tools and without welding; where said container is configured to be lifted by fork portions of a vehicle.

20 Claims, 10 Drawing Sheets

(56) References Cited

U.S. PATENT DOCUMENTS

| | | | | | |
|---|---|---|---|---|---|
| 4,508,237 | A | * | 4/1985 | Kreeger | B65D 11/182 206/509 |
| 4,513,064 | A | | 4/1985 | Marcus | |
| 4,676,431 | A | * | 6/1987 | Teske | B65F 1/122 220/908 |
| 4,778,098 | A | | 10/1988 | Rimbaud | |
| 4,913,301 | A | | 4/1990 | Pickler | |
| 4,934,858 | A | | 6/1990 | Beaulieu | |
| 5,183,180 | A | | 2/1993 | Hawkins et al. | |
| 5,279,436 | A | | 1/1994 | Elliott et al. | |
| 5,335,805 | A | * | 8/1994 | Chen | B65F 1/02 220/668 |
| 5,378,545 | A | | 1/1995 | Akulow | |
| 5,505,323 | A | | 4/1996 | Naoki et al. | |
| 5,671,862 | A | * | 9/1997 | Cobos | B65F 1/02 220/1.5 |
| 5,878,940 | A | | 3/1999 | Rosenbalm | |
| 5,967,361 | A | * | 10/1999 | Darnell | B65F 1/02 220/623 |
| 6,135,666 | A | | 10/2000 | Kelly et al. | |
| 6,632,064 | B1 | | 10/2003 | Walker et al. | |
| 6,634,541 | B1 | | 10/2003 | Hankey et al. | |
| 6,711,860 | B2 | | 3/2004 | Fleishman | |
| 6,895,651 | B2 | | 5/2005 | Li | |
| 7,198,166 | B2 | | 4/2007 | Sholinder | |
| 7,464,509 | B1 | | 12/2008 | Brown | |
| 7,762,565 | B2 | | 7/2010 | Hatamian et al. | |
| 7,815,068 | B2 | * | 10/2010 | Clark | B60J 7/085 220/345.1 |
| 8,123,061 | B1 | * | 2/2012 | Brown | B65F 1/02 220/4.28 |
| 8,251,237 | B2 | | 8/2012 | Beaudonnet | |
| 8,961,059 | B2 | | 2/2015 | Reeves et al. | |
| 2004/0178196 | A1 | * | 9/2004 | Sholinder | B65F 1/02 220/4.33 |
| 2005/0071980 | A1 | * | 4/2005 | Rasmussen | B21D 17/02 29/462 |
| 2005/0138976 | A1 | * | 6/2005 | Howes | B65F 1/1615 70/159 |
| 2005/0178765 | A1 | * | 8/2005 | Howes | B65F 1/1615 220/210 |
| 2007/0108085 | A1 | | 5/2007 | Andrade | |
| 2008/0135566 | A1 | | 6/2008 | Johnson | |
| 2008/0237251 | A1 | | 10/2008 | Barber | |
| 2009/0242553 | A1 | | 10/2009 | Mickelson | |
| 2011/0180533 | A1 | * | 7/2011 | Hay | B65D 19/18 220/4.28 |
| 2012/0043327 | A1 | | 2/2012 | Baltz et al. | |
| 2012/0125925 | A1 | * | 5/2012 | Brown | B65F 1/02 220/4.28 |
| 2013/0020843 | A1 | * | 1/2013 | Rauch | A47C 5/005 297/188.01 |
| 2015/0076145 | A1 | * | 3/2015 | Warren | B65F 1/141 220/9.4 |
| 2015/0118005 | A1 | * | 4/2015 | Bennett | B65F 1/122 414/800 |

* cited by examiner

METHOD AND APPARATUS FOR CONSTRUCTING STEEL GARBAGE DUMPSTERS

FIELD OF THE INVENTION

The present invention generally relates to steel garbage dumpsters, and more particularly relates to kits for making steel garbage dumpsters, and even more particularly, relates to steel garbage dumpster panel mating structures and methods.

BACKGROUND OF THE INVENTION

In the past, steel garbage dumpsters have typically been assembled at a manufacturing facility and delivered to wholesalers and end users. Often the end users are located in relatively close proximity to the manufacturing facility because the cost of shipping fully assembled dumpsters can be expensive. As a result, numerous and geographically dispersed manufacturing facilities exist for fabrication of garbage dumpsters. To further avoid the need for extensive shipping costs, end users of such dumpsters will often re-weld, repair, paint and otherwise maintain their own dumpsters at or very near where they are placed in service.

While these types of garbage dumpster manufacturing operations and systems may have many advantages in particular applications, they also have some drawbacks. For example, the larger the number of dumpster manufacturers results in a smaller average production output volume at each facility. This hinders some of such operations from further benefit from economies of scale in manufacturing these items. These dispersed operations and facilities are not typically coordinated and significant variation in dumpster design exists across these disparate manufacturers. This lack of standardization optimization may result in further inefficiencies in using and maintaining such dumpsters.

Consequently, there exists a need for improved methods and apparatuses for efficiently manufacturing and maintaining garbage dumpsters.

SUMMARY OF THE INVENTION

It is an object of the present invention to provide an easily implementable and efficient method, system and kit for manufacturing garbage dumpsters over a wide range of scenarios.

It is a feature of the present invention to utilize a kit with panels having mating structures thereon and therein for facilitating assembly and construction of garbage dumpsters.

It is an advantage of the present invention to empower typical dumpster repair and maintenance personnel with the ability to assemble their own dumpsters and allow for simultaneous reduction of cost of materials, shipping and/or labor.

The present invention is an apparatus and method for efficiently and cost effectively providing garbage dumpster kits for delivery in an unassembled state to a distant location where assembly and construction is done.

Accordingly, the present invention is a method of constructing garbage dumpsters which includes the following steps:

- providing a package of substantially parallel panels comprising:
  - a bottom panel;
  - a hooked back panel;
  - a garbage dumpster front panel

- a garbage dumpster left panel; and
  - a garbage dumpster right panel;
- without using a fixture to locate a first panel, which is a first one of said hooked back panel, said garbage dumpster front panel, said garbage dumpster left panel and said garbage dumpster right panel; inserting a garbage dumpster interlocking tab coupled with said first panel through a garbage dumpster interlocking tab receiving slot in said bottom panel;
- causing relative sliding to occur between said bottom panel and said first panel and thereby causing said first panel to mate to said bottom panel;
- without using a fixture to locate a second panel, which is a second one of said hooked back panel, said garbage dumpster front panel, said garbage dumpster left panel and said garbage dumpster right panel; inserting a garbage dumpster interlocking tab coupled with said second panel through a garbage dumpster interlocking tab receiving slot 114 in one of said first panel and said bottom panel 1;
- causing relative sliding to occur between said one of said first panel and bottom panel 1 and thereby causing said second panel mate to said bottom panel 1;
- without using a fixture to locate a third panel, which is a third one of said hooked back panel 2, said garbage dumpster front panel 3, said garbage dumpster left panel 4 and said garbage dumpster right panel 5, inserting a garbage dumpster interlocking tab 122 coupled with said third panel through a garbage dumpster interlocking tab receiving slot 114 in one of said first panel, said second panel and said bottom panel 1;
- causing relative sliding to occur between said one of said first panel, said second panel and said bottom panel 1 and thereby causing said third panel to freely stand substantially orthogonal to said bottom panel 1;
- without using a fixture to stabilize a fourth panel, which is a last one remaining of said hooked back panel 2, said garbage dumpster front panel 3, said garbage dumpster left panel 4 and said garbage dumpster right panel 5, inserting a garbage dumpster interlocking tab 122 coupled with said fourth panel through a garbage dumpster interlocking tab receiving slot 114 in one of said first panel, said second panel, said third panel and said bottom panel 1;
- causing relative sliding to occur between said one of said first panel, said second panel, said third panel and said bottom panel 1 and thereby causing said fourth panel to freely stand substantially orthogonal to said bottom panel 1;
- welding joints existing between adjacent panels between said bottom panel 1, said hooked back panel 2, said garbage dumpster front panel 3, said garbage dumpster left panel 4 and said garbage dumpster right panel 5 and thereby creating a garbage dumpster sized to hold two yards of matter, and configured to be lifted and be dumped into a garbage truck, by an apparatus on said garbage truck.

Additionally, the present invention is a system for constructing garbage dumpsters comprising a package of panels comprising:

- a steel bottom panel having a plurality of steel garbage dumpster interlocking tab receiving slots therein;
- a steel back panel having a plurality of steel garbage dumpster interlocking tabs, where each tab comprises a garbage dumpster interlocking tab overlapping end portion, with a distally decreasing thickness characteristic;

a steel garbage dumpster front panel having a plurality of steel garbage dumpster interlocking tabs, where each tab comprises a garbage dumpster interlocking tab overlapping end portion, with a distally decreasing thickness characteristic;

a steel garbage dumpster left panel having a plurality of steel garbage dumpster interlocking tabs, where each tab comprises a garbage dumpster interlocking tab overlapping end portion, with a distally decreasing thickness characteristic; and a steel garbage dumpster right panel having a plurality of steel garbage dumpster interlocking tabs, where each tab comprises a garbage dumpster interlocking tab overlapping end portion, with a distally decreasing thickness characteristic;

said package being configured for being combined, without use of a fixture to stabilize panels during assembly of the package and forming a garbage dumpster configured to hold two yards of matter or more and further being configured to be lifted and dumped by a garbage truck.

Additionally, the present invention is an unassembled garbage dumpster comprising:

a bottom panel;

a back panel;

a garbage dumpster front panel;

a garbage dumpster left panel;

a garbage dumpster right panel; and wherein said bottom panel, said back panel; said garbage dumpster front panel; said garbage dumpster left panel; and said garbage dumpster right panel; are configured so that a last remaining one of said panels can be hung on a plurality of hooks protruding from edges of two of said panels, thereby creating a garbage dumpster without using tools and without welding; where said garbage dumpster is configured to be lifted by portions of a garbage truck and dumped into a refuse container on said garbage truck.

BRIEF DESCRIPTION OF THE DRAWINGS

The invention may be more fully understood by reading the foregoing description of the preferred embodiments of the invention, in conjunction with the appended drawing wherein.

DETAILED DESCRIPTION

Although described with particular reference to garbage dumpsters, such as a two yard dumpster, the systems and methods of the present invention can be implemented in many different types of container devices each with potentially different uses and amounts of sub assembly. These container types may include dumpsters of any size, stackable boxes, and any type of container.

Figure 1:
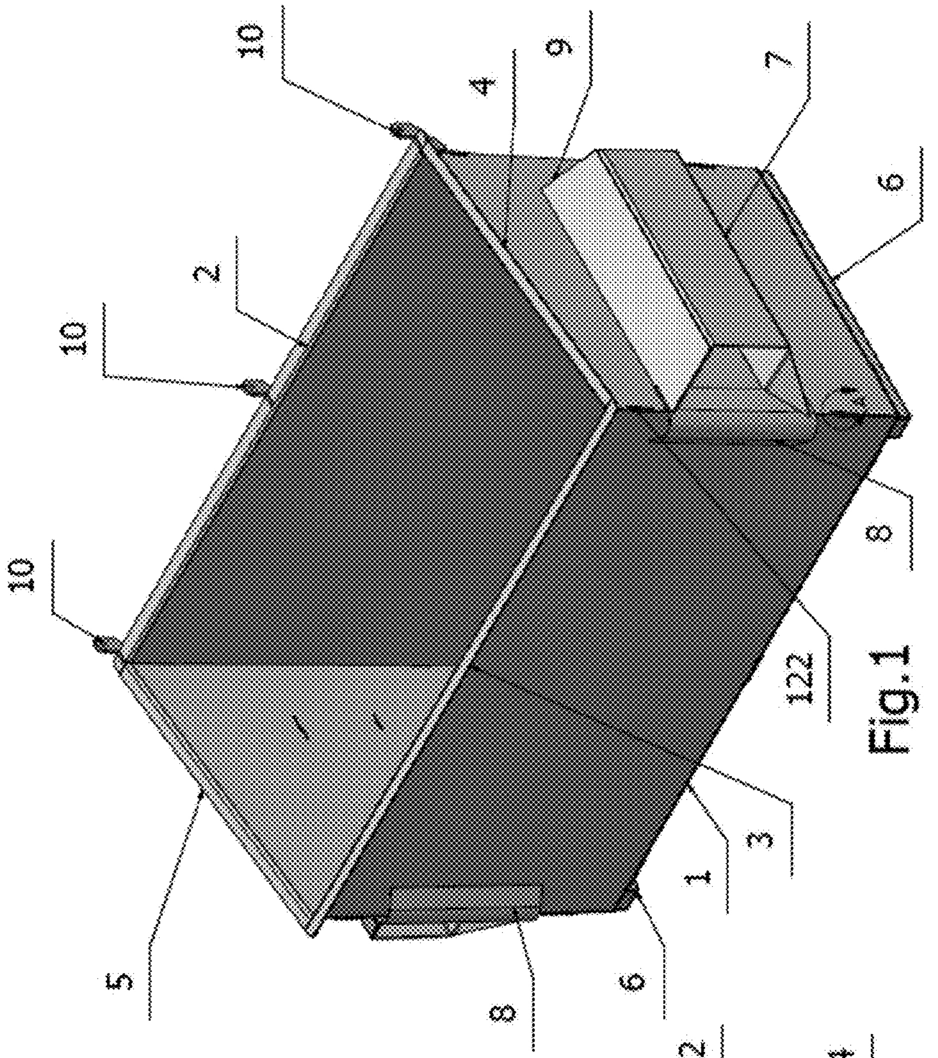
FIG. 1 is a perspective view of an assembled garbage dumpster of the present invention.

Now referring to the figures where like numeral refers to like matter and text throughout, and more specifically FIG. 1 shows a garbage dumpster, generally designated 100, which was assembled using the methods, materials and systems of the present invention. Garbage dumpster 100 includes a bottom panel 1 with a plurality of garbage dumpster interlocking tab receiving slots 114 therein, with a hooked back panel 2, garbage dumpster front panel 3, garbage dumpster left panel 4 and garbage dumpster right panel 5 attached thereto via hooks coupled thereto or integrated therewith. The materials of garbage dumpster 100 can be any suitable material. However, steel with a thickness between 14 gauge and ⅜ inch may be preferred in numerous applications. Hooked back panel 2 is shown and described as having at least two hooks formed in each of its left, right and bottom edges. Similarly, garbage dumpster front panel 3 is shown and described as having at least two hooks formed in each of its left, right and bottom edges. The term garbage dumpster interlocking tab 122 is used herein to refer to the hooks as shown. However, it should be understood that this term could also describe a non-hooked protuberance in some applications.

Figure 2:
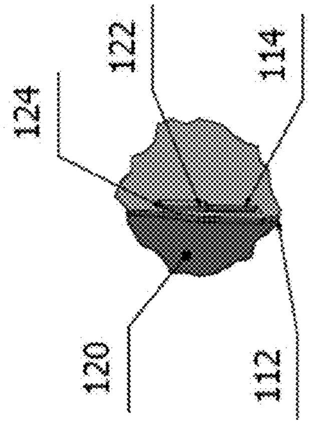
FIG. 2 is an enlarged detail view of a hook and slot configuration as shown in FIG. 1 and labeled as detail A.

A more detailed view of the hook and slot interlocking configuration is shown in FIG. 2, which includes hooked panel non-slot penetrating surface 120 and slotted panel medial hook side mating surface 110, which could be garbage dumpster front panel 3 and garbage dumpster left panel 4, respectively. Garbage dumpster interlocking tab 122 is coupled to or integrated with a panel having a hooked panel non-slot penetrating surface 120. Slotted panel medial hook side mating surface 110 is oriented orthogonal to hooked panel non-slot penetrating surface 120. Garbage dumpster interlocking tab receiving slot 114 is made in slotted panel medial hook side mating surface 110. Garbage dumpster interlocking tab 122 is inserted through garbage dumpster interlocking tab receiving slot 114 and then the hooked panel non-slot penetrating surface 120 is slid so that garbage dumpster interlocking tab overlapping end portion 124 overlaps a portion of slotted panel medial hook side mating surface 110. Multiple hooks and slots may be formed in a pair of panels to be mated. The area below bumper 8 and pocket 7, shown in FIG. 1 as Detail A, could be identical to a second hook and slot configuration above pocket 7 and bumper 8. Garbage dumpster front panel 3 could have two hooks formed in each of the left edge and the right edge.

Also the bottom edge of hooked back panel 2 and garbage dumpster front panel 3 could have at least two similar hooks formed therein for mating with slots in said bottom panel 1.

Figure 3:
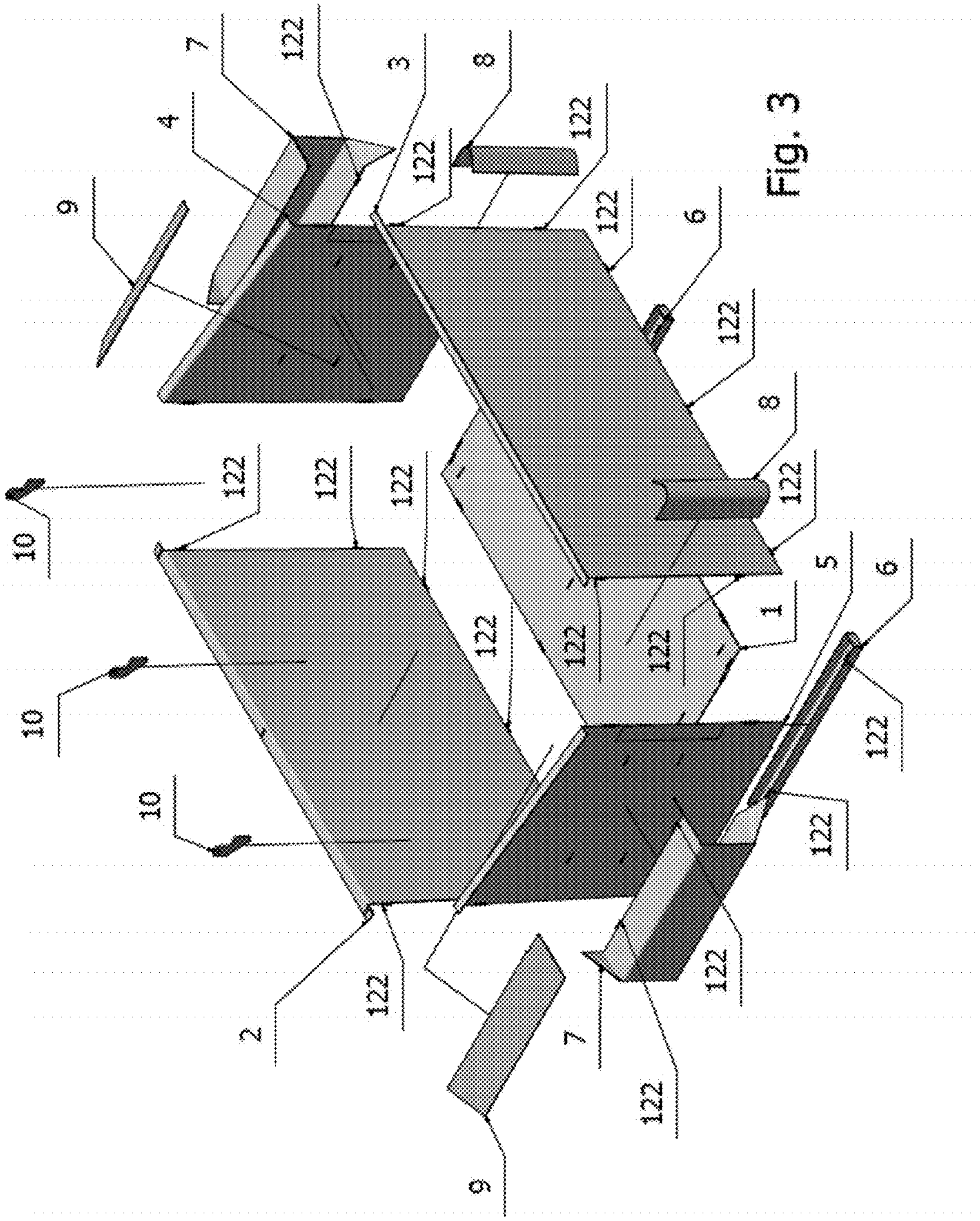
FIG. 3 is an exploded perspective view of the dumpster of FIG. 1.

Now referring to FIG. 3, there is shown an exploded view of the garbage dumpster 100 of FIG. 1.

Figure 4:
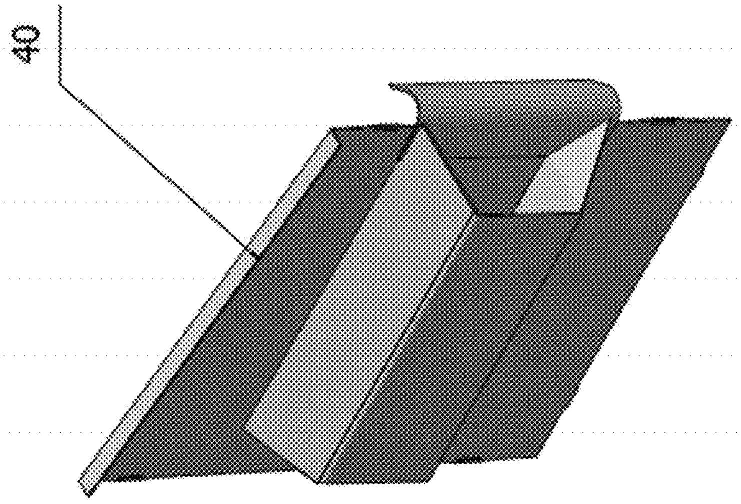
FIG. 4 is a perspective view of a side assembly of FIG. 1.

Now referring to FIG. 4, there is shown a garbage dumpster right side assembly which is mounted, as a single component, to bottom panel 1.

Figure 5:
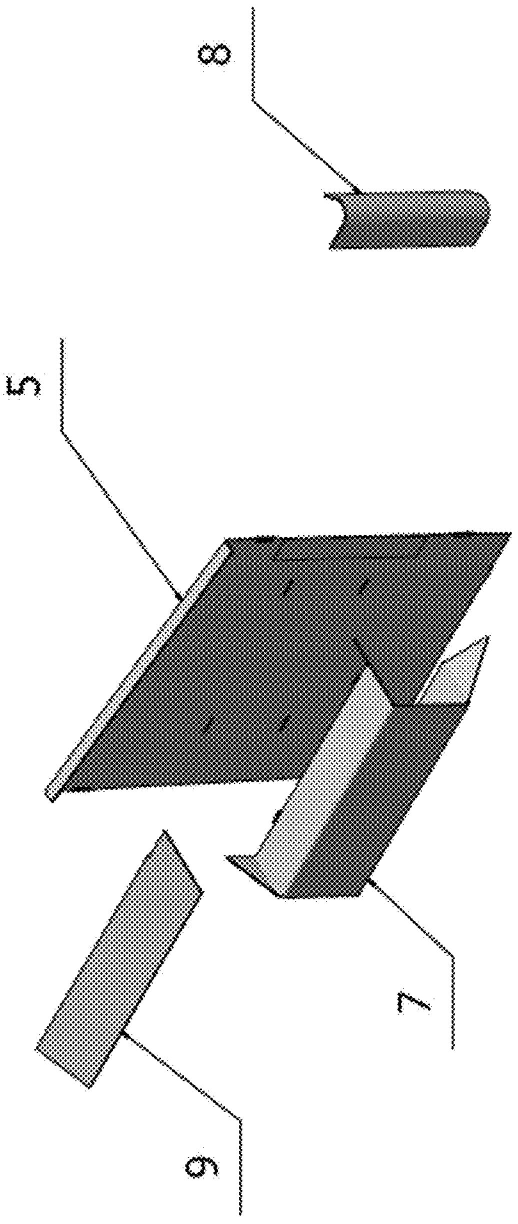
FIG. 5 is an exploded perspective view of the side assembly of FIG. 5.

Now referring to FIG. 5, there is shown an exploded view of the garbage dumpster right side assembly 40 of FIG. 4.

Figure 6:
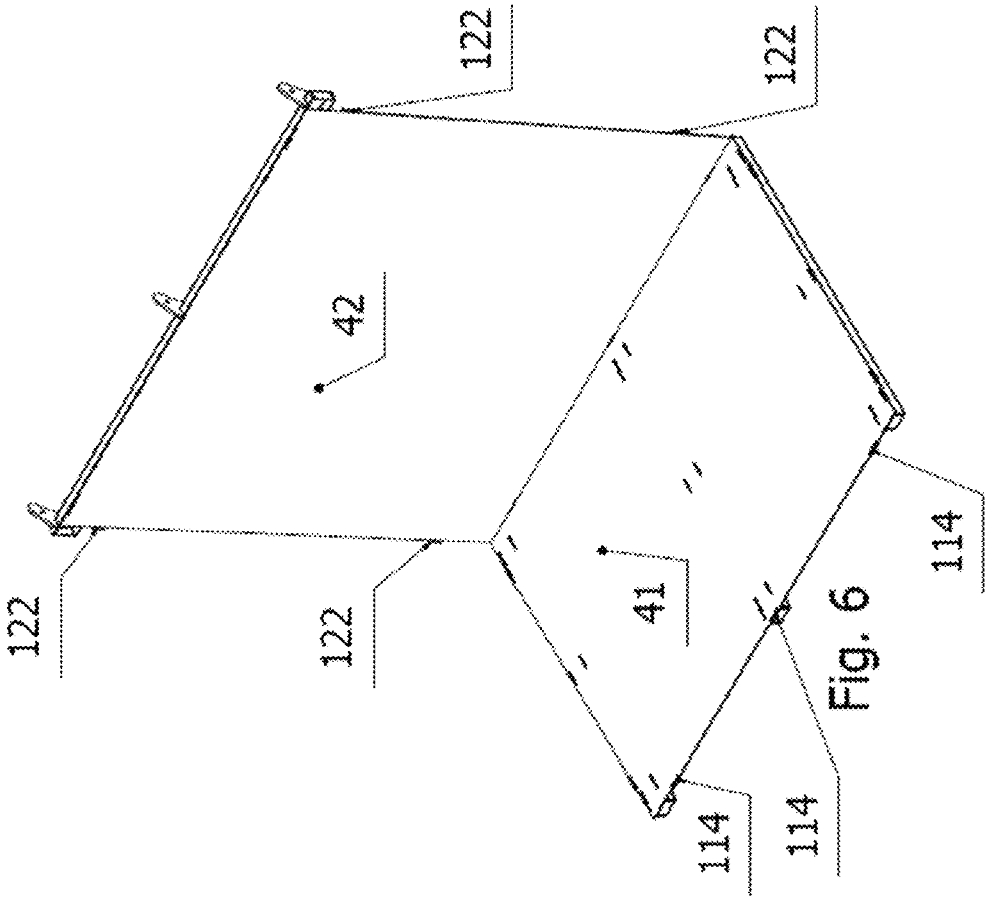
FIG. 6 is a perspective view of a partially assembled garbage dumpster of a higher storage capacity version of the dumpster shown in FIG. 3.

Now referring to FIGS. 6-15, there is shown a series of steps of the assembly of a higher storage capacity version of the garbage dumpster 100. More specifically, FIG. 6 shows a garbage dumpster 400 (FIG. 14) where the storage capacity of the dumpster is four yards, but otherwise is quite similar to garbage dumpster 100, but at an early stage of assembly. There is shown a bottom panel 41 and hooked back panel 42.

Figure 7:
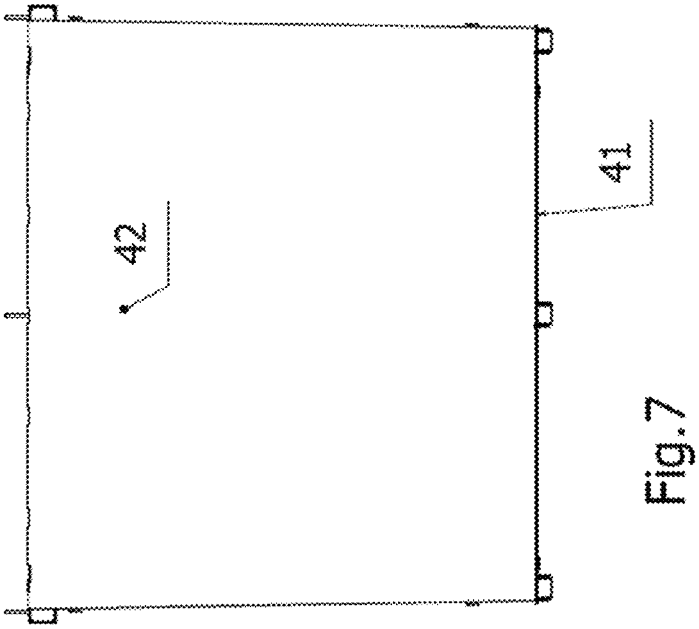
FIG. 7 is a front view of the partially assembled garbage dumpster shown in FIG. 6.

Now referring to FIG. 7, there is shown a front view of the dumpster 9 of FIG. 6.

Figure 8:
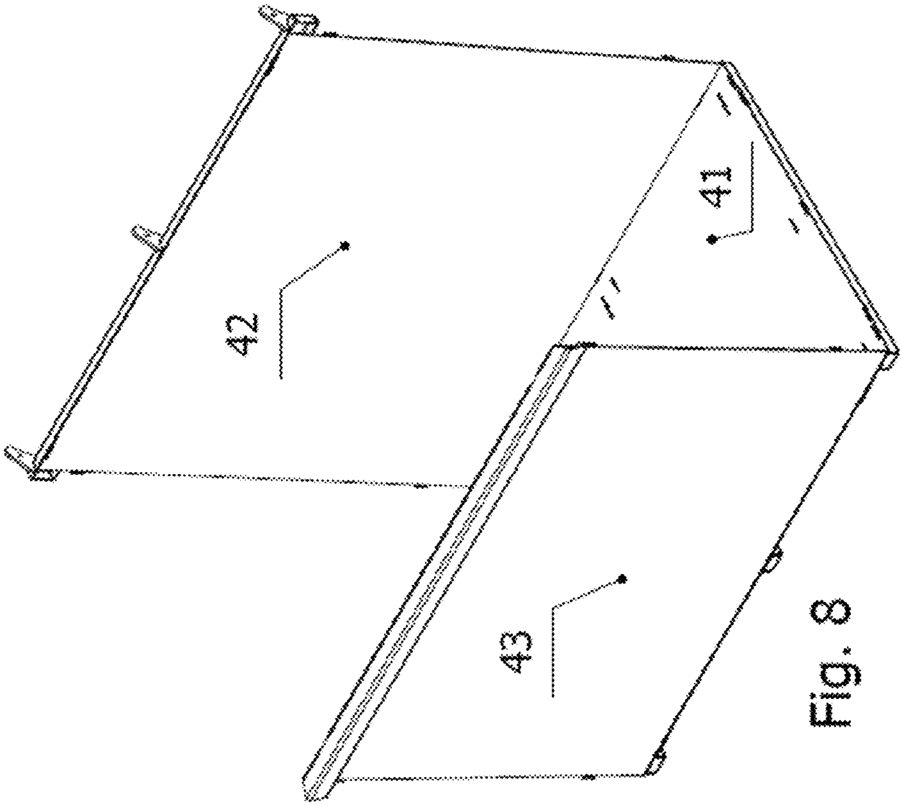
FIG. 8 is a perspective view of a further partially assembled garbage dumpster shown in FIG. 6.

FIG. 8 shows a garbage dumpster of FIG. 6 at a further stage of assembly. There is shown an additional garbage dumpster front panel 43.

Figure 9:
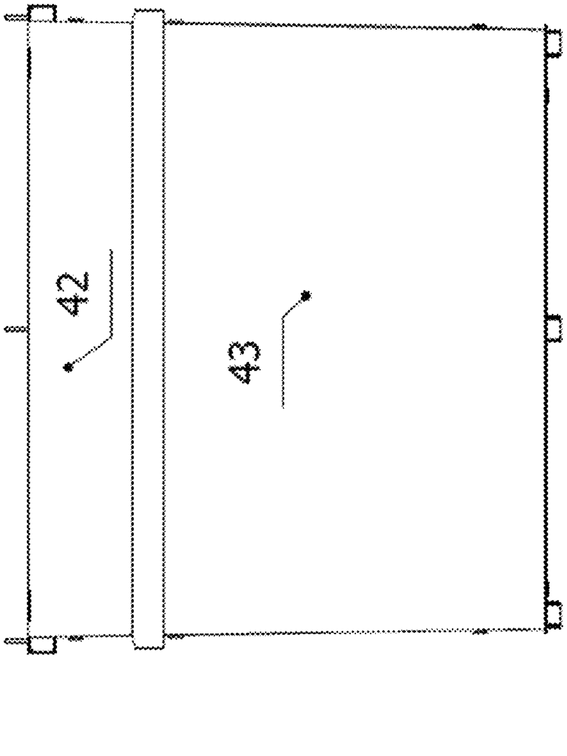
FIG. 9 is a front view of the further partially assembled garbage dumpster shown in FIG. 8.

Now referring to FIG. 9, there is shown a front view of the dumpster of FIG. 8.

Figure 10:
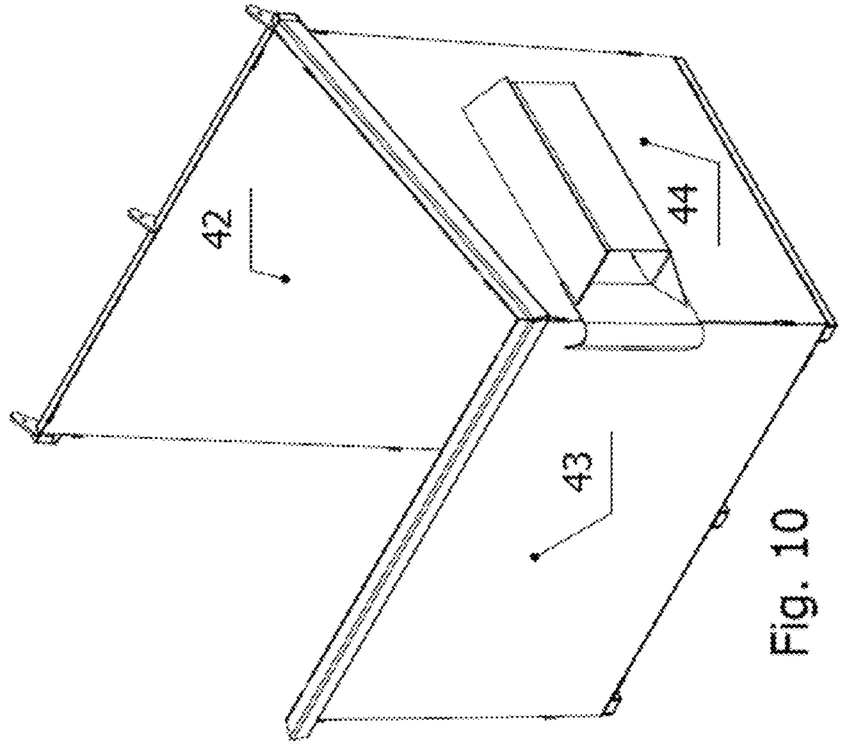
FIG. 10 is a perspective view of a further partially assembled garbage dumpster shown in FIG. 8.

FIG. 10 shows a garbage dumpster of FIG. 8 at a further stage of assembly. There is shown an additional garbage dumpster left panel 44.

Figure 11:
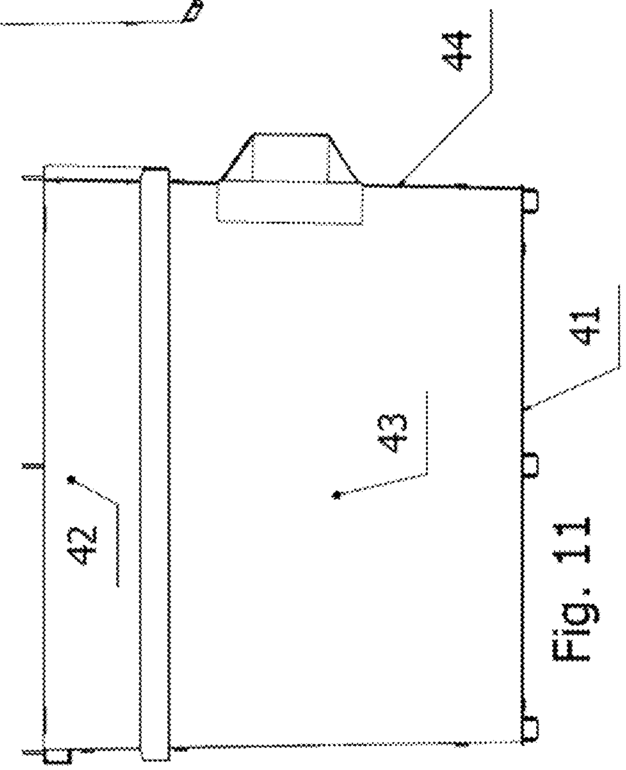
FIG. 11 is a front view of the further partially assembled garbage dumpster shown in FIG. 10.

Now referring to FIG. 11, there is shown a front view of the dumpster of FIG. 10.

Figure 12:
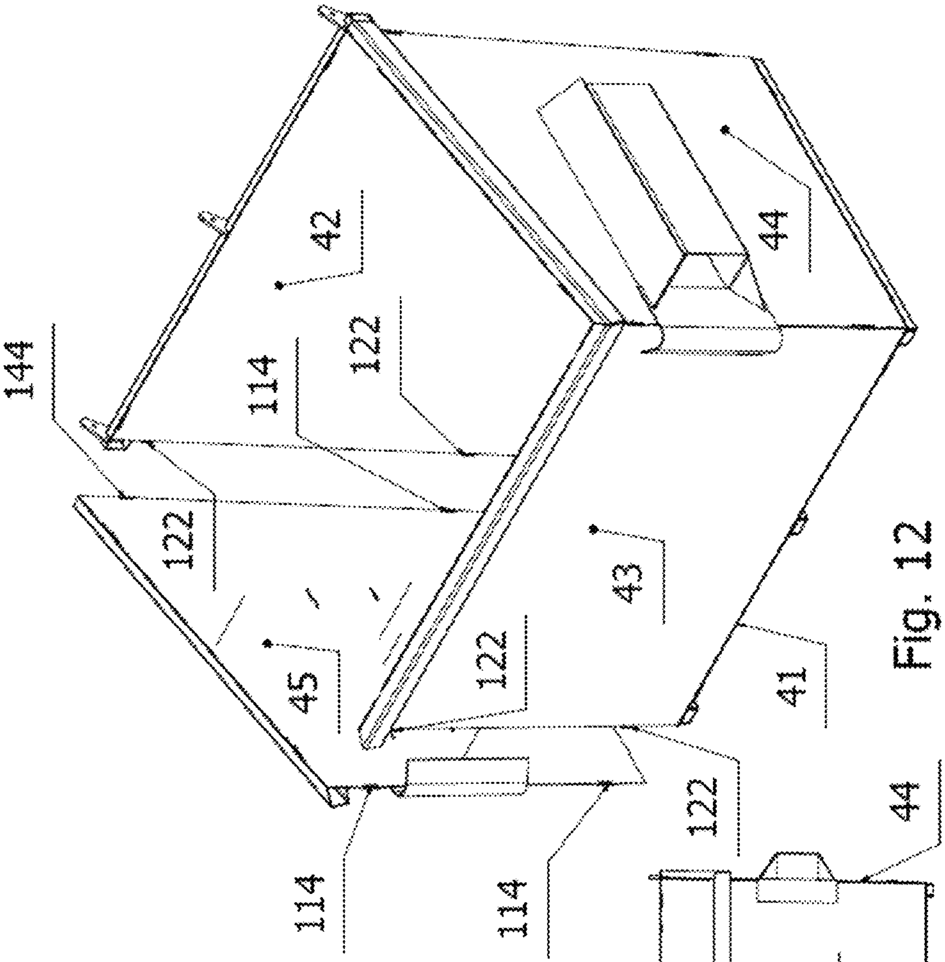
FIG. 12 is a partially exploded view of a perspective view of a still further partially assembled garbage dumpster shown in FIG. 10.

FIG. 12 shows a partially exploded view of a garbage dumpster of FIG. 10 at a further stage of assembly. There is shown an additional garbage dumpster right panel 45, which represent the configuration before the panel 45 is hung, through its garbage dumpster interlocking tab receiving slots 114, on the garbage dumpster interlocking hooks 122 formed in the right edges of both the back panel 2 and the front panel 3.

Figure 13:
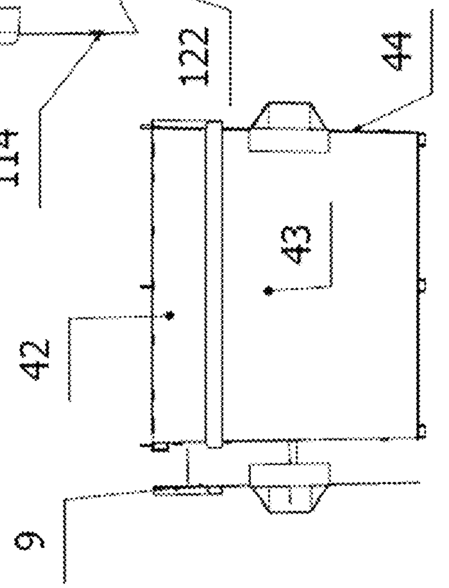
FIG. 13 is a front view of the partially exploded view of the still further partially assembled garbage dumpster shown in FIG. 12.

Now referring to FIG. 13, there is shown a front view of the dumpster of FIG. 12.

Figure 14:
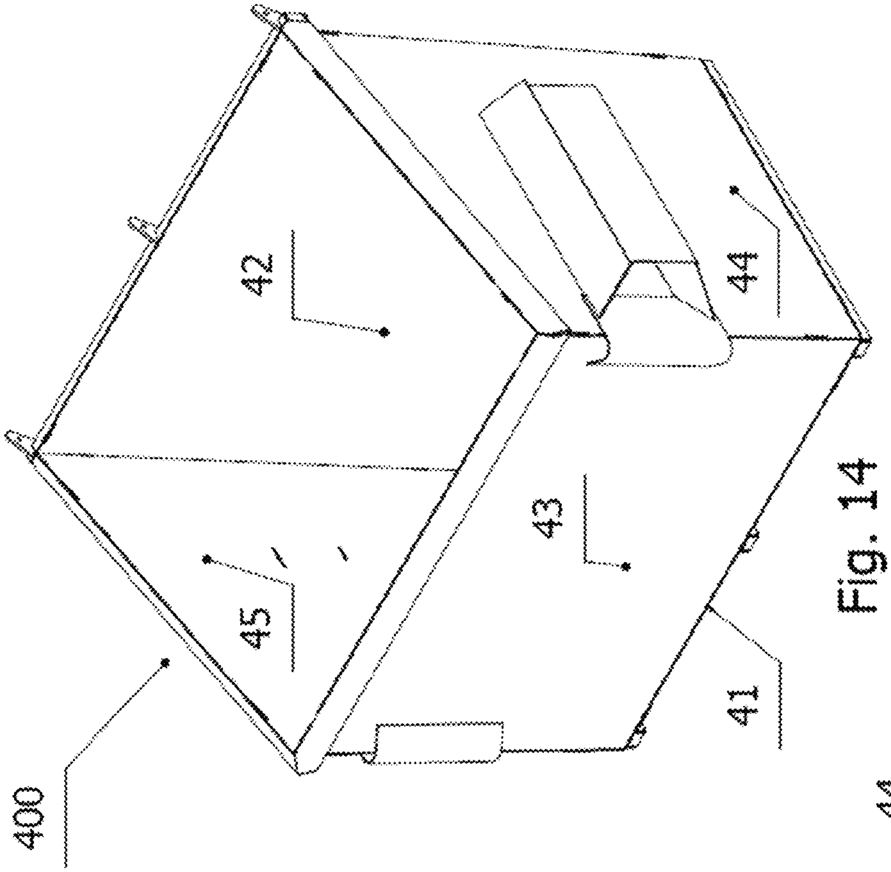
FIG. 14 is a non-partially exploded perspective view of the garbage dumpster shown in FIG. 12.

FIG. 14 shows a non-exploded view of the garbage dumpster of FIG. 12.

Figure 15:
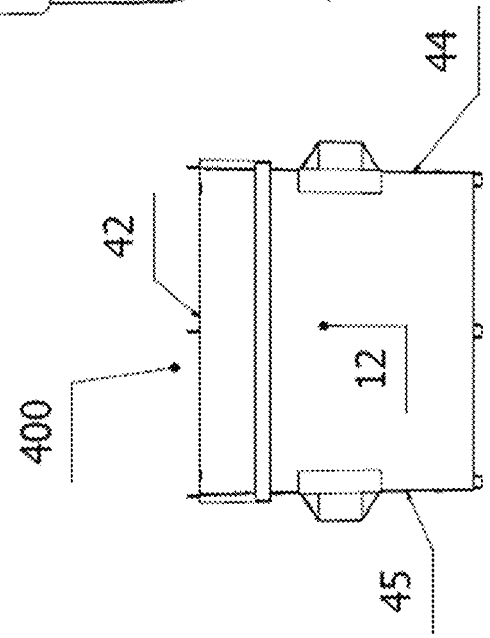
FIG. 15 is a non-partially exploded front view of the garbage dumpster shown in FIG. 12.

Now referring to FIG. 15, there is shown a front view of the dumpster of FIG. 14.

Figure 16:
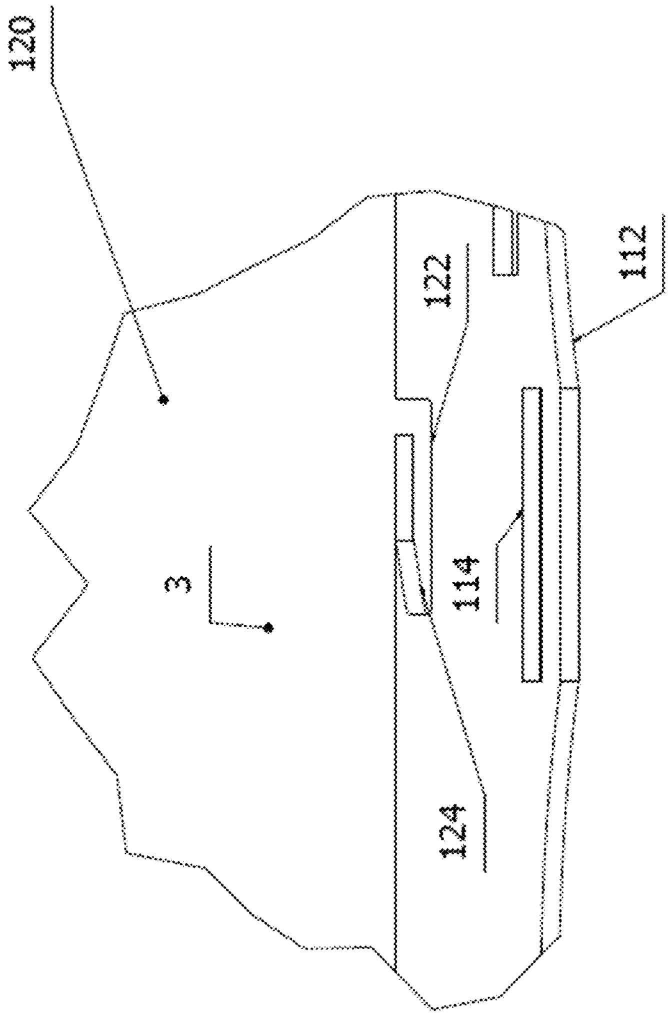
FIG. 16 is a close up view of the hook and slot configuration of the present invention.

Now referring to FIG. 16, there is shown an additional close up view of the hook and slot configuration of the present invention. Hooked panel non-slot penetrating surface 120 is shown as being a portion of garbage dumpster front panel 3. Garbage dumpster interlocking tab 122 is shown to have a distal end (away from the main portion of garbage dumpster front panel 3). In this orientation, garbage dumpster interlocking tab 122 would be on the bottom edge of garbage dumpster front panel 3. Garbage dumpster interlocking tab receiving slot 114 would be found in the bottom panel 1. However, if this FIG. 16 were rotated clockwise 90 degrees, it then could be interpreted as showing an upwardly open hook on a vertical edge of garbage dumpster front panel 3. this would mean that garbage dumpster interlocking tab receiving slot 114 would be a portion of garbage dumpster left panel 4 or garbage dumpster right panel 5. In either situation, garbage dumpster interlocking tab 122 is shown in an orientation where garbage dumpster front panel 3 is about to be mated with the panel containing garbage dumpster interlocking tab receiving slot 114. The gap between the distal edge of garbage dumpster interlocking tab 122 and the proximal edge of the garbage dumpster interlocking tab receiving slot 114 will be decreasing, become zero and then increase as the garbage dumpster interlocking tab 122 occupies more and more of the space within garbage dumpster interlocking tab receiving slot 114. Eventually the distal edge of garbage dumpster interlocking tab 122 will pass the distal edge of garbage dumpster interlocking tab receiving slot 114 and garbage dumpster interlocking tab overlapping end portion 124 will be visible on the back side of the panel with garbage dumpster interlocking tab receiving slot 114. At this point, a transverse motion of the two panels can be combined with continued motion causing increased penetration of garbage dumpster interlocking tab 122 into garbage dumpster interlocking tab receiving slot 114. This transverse motion creates an interlocking relationship between the two panels with the intersection of an angled medial side of garbage dumpster interlocking tab 122 and an end of garbage dumpster interlocking tab receiving slot 114.

The present invention could be any type of container which utilizes the panel interlocking/interconnection scheme of the present invention. To that end it could include a mere box comprising: a bottom panel; a back panel; a front panel; a left panel; a right panel; wherein said bottom panel, said back panel; said front panel; said left panel; and said right panel; are configured so that a last remaining one of said panels can be hung on a plurality of hooks protruding from edges of two of said panels, thereby creating a container without using tools and without welding; where said container is configured to be lifted by fork portions of a vehicle.

In an embodiment, the system and method of the present invention can be implemented as partially assembled kits. The kit implementation of the system and method of the present invention can include any or a combination of the several subassemblies. The details below should be viewed as examples of many potential variations of the present invention which are protected hereunder.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

We claim:

1. A method of both making and maintaining a garbage dumpster comprising the steps of:

providing a package of substantially parallel panels comprising:
- a bottom panel 1;
- a hooked back panel 2;
- a garbage dumpster front panel 3;
- a garbage dumpster left panel 4; and
- a garbage dumpster right panel 5;

without using a fixture to locate a first panel, which is a first one of said hooked back panel 2, said garbage dumpster front panel 3, said garbage dumpster left panel 4 and said garbage dumpster right panel 5; inserting a garbage dumpster interlocking tab 122 coupled with said first panel through a garbage dumpster interlocking tab receiving slot 114 in said bottom panel 1;

causing relative sliding to occur between said bottom panel 1 and said first panel and thereby causing said first panel to mate to said bottom panel 1;

without using a fixture to locate a second panel, which is a second one of said hooked back panel 2, said garbage dumpster front panel 3, said garbage dumpster left panel 4 and said garbage dumpster right panel 5; inserting a garbage dumpster interlocking tab 122 coupled with said second panel through a garbage dumpster interlocking tab receiving slot 114 in one of said first panel and said bottom panel 1;

causing relative sliding to occur between said one of said first panel and bottom panel 1 and thereby causing said second panel mate to said bottom panel 1;

without using a fixture to locate a third panel, which is a third one of said hooked back panel 2, said garbage dumpster front panel 3, said garbage dumpster left panel 4 and said garbage dumpster right panel 5, inserting a garbage dumpster interlocking tab 122 coupled with said third panel through a garbage dumpster interlocking tab receiving slot 114 in one of said first panel, said second panel and said bottom panel 1;

causing relative sliding to occur between said one of said first panel, said second panel and said bottom panel 1 and thereby causing said third panel to freely stand substantially orthogonal to said bottom panel 1;

without using a fixture to stabilize a fourth panel, which is a last one remaining of said hooked back panel 2, said garbage dumpster front panel 3, said garbage dumpster left panel 4 and said garbage dumpster right panel 5, inserting a garbage dumpster interlocking tab 122 coupled with said fourth panel through a garbage dumpster interlocking tab receiving slot 114 in one of said first panel, said second panel, said third panel and said bottom panel 1;

causing relative sliding to occur between said one of said first panel, said second panel, said third panel and said bottom panel 1 and thereby causing said fourth panel to freely stand substantially orthogonal to said bottom panel 1;

welding joints existing between adjacent panels between said bottom panel 1, said hooked back panel 2, said garbage dumpster front panel 3, said garbage dumpster left panel 4 and said garbage dumpster right panel 5 and thereby creating a garbage dumpster sized to hold two yards of matter, and configured to be lifted and be dumped into a garbage truck, by an apparatus on said garbage truck.

2. The method of claim 1 wherein each of said bottom panel 1, said hooked back panel 2, said garbage dumpster front panel 3, said garbage dumpster left panel 4 and said garbage dumpster right panel 5 comprises steel with a thickness characteristic between 14 gauge and ⅜ of an inch.

3. The method of claim 2 wherein said step of providing a package comprises purchasing said package and requested shipment of said package a distance greater than 500 miles.

4. The method of claim 1 wherein said garbage dumpster interlocking tab 122 comprises a garbage dumpster interlocking tab overlapping end portion 124.

5. The method of claim 4 further wherein said garbage dumpster interlocking tab overlapping end portion 124 has a differential separation from a planar portion of a panel disposed adjacent thereto.

6. The method of claim 1 further comprising the steps of:

using a human for welding during both making and maintaining said garbage dumpster.

7. The method of claim 6 wherein said step of providing a package is done without any metal work assistance from said human.

8. A method of both making and maintaining a garbage dumpster comprising the steps of:

providing a package of substantially parallel panels comprising:

a bottom panel;

a hooked back panel;

a dumpster front panel;

a dumpster left panel; and a dumpster right panel;

without using a fixture to locate a first panel, which is a first one of said hooked back panel, said dumpster front panel, said dumpster left panel and said dumpster right panel; inserting a dumpster interlocking tab coupled with said first panel through a dumpster interlocking tab receiving slot in said bottom panel;

causing relative sliding to occur between said bottom panel and said first panel and thereby causing said first panel to mate to said bottom panel;

without using a fixture to locate a second panel, which is a second one of said hooked back panel, said dumpster front panel, said dumpster left panel and said dumpster right panel; inserting a dumpster interlocking tab coupled with said second panel through a dumpster interlocking tab receiving slot in one of said first panel and said bottom panel;

causing relative sliding to occur between said one of said first panel and bottom panel and thereby causing said second panel mate to said bottom panel;

without using a fixture to locate a third panel, which is a third one of said hooked back panel, said dumpster front panel, said dumpster left panel and said dumpster right panel, inserting a dumpster interlocking tab coupled with said third panel through a dumpster interlocking tab receiving slot in one of said first panel, said second panel and said bottom panel;

causing relative sliding to occur between said one of said first panel, said second panel and said bottom panel and thereby causing said third panel to freely stand substantially orthogonal to said bottom panel;

without using a fixture to stabilize a fourth panel, which is a last one remaining of said hooked back panel, said dumpster front panel, said dumpster left panel and said dumpster right panel, inserting a dumpster interlocking tab coupled with said fourth panel through a dumpster interlocking tab receiving slot in one of said first panel, said second panel, said third panel and said bottom panel;

causing relative sliding to occur between said one of said first panel, said second panel, said third panel and said bottom panel and thereby causing said fourth panel to freely stand substantially orthogonal to said bottom panel;

welding joints existing between adjacent panels between said bottom panel, said hooked back panel, said garbage dumpster front panel, said dumpster left panel and said dumpster right panel and thereby creating a dumpster sized to hold two yards of matter, and configured to be lifted and be dumped into a truck, by an apparatus on said truck.

9. The method of claim 8 wherein each of said bottom panel, said hooked back panel, said dumpster front panel, said dumpster left panel and said dumpster right panel comprises steel with a thickness characteristic between 14 gauge and ⅜ of an inch.

10. The method of claim 9 wherein said step of providing a package comprises purchasing said package and requested shipment of said package a distance greater than 500 miles.

11. The method of claim 8 wherein said dumpster interlocking tab comprises a dumpster interlocking tab overlapping end portion.

12. The method of claim 11 further wherein said dumpster interlocking tab overlapping end portion has a differential separation from a planar portion of a panel disposed adjacent thereto.

13. The method of claim 8 further comprising the steps of:
using a human for welding during both making and maintaining said dumpster.

14. The method of claim 13 wherein said step of providing a package is done without any metal work assistance from said human.

15. A method of both making and maintaining a garbage dumpster comprising the steps of:
providing a package of substantially parallel panels comprising:
a bottom panel;
a hooked back panel;
a dumpster front panel;
a dumpster left panel; and
a dumpster right panel;
without using a fixture to locate a first panel, which is a first one of said hooked back panel, said dumpster front panel, said dumpster left panel and said dumpster right panel; inserting a dumpster interlocking tab coupled with said first panel through a dumpster interlocking tab receiving slot in said bottom panel;
causing relative sliding to occur between said bottom panel and said first panel and thereby causing said first panel to mate to said bottom panel;
without using a fixture to locate a second panel, which is a second one of said hooked back panel, said dumpster front panel, said dumpster left panel and said dumpster right panel; inserting a dumpster interlocking tab coupled with said second panel through a dumpster interlocking tab receiving slot in one of said first panel and said bottom panel;
causing relative sliding to occur between said one of said first panel and bottom panel and thereby causing said second panel mate to said bottom panel;
without using a fixture to locate a third panel, which is a third one of said hooked back panel, said dumpster front panel, said dumpster left panel and said dumpster right panel, inserting a dumpster interlocking tab coupled with said third panel through a dumpster interlocking tab receiving slot in one of said first panel, said second panel and said bottom panel;
causing relative sliding to occur between said one of said first panel, said second panel and said bottom panel and thereby causing said third panel to freely stand substantially orthogonal to said bottom panel;
without using a fixture to stabilize a fourth panel, which is a last one remaining of said hooked back panel, said dumpster front panel, said dumpster left panel and said dumpster right panel, inserting a dumpster interlocking tab coupled with said fourth panel through a dumpster interlocking tab receiving slot in one of said first panel, said second panel, said third panel and said bottom panel;
causing relative sliding to occur between said one of said first panel, said second panel, said third panel and said bottom panel and thereby causing said fourth panel to freely stand substantially orthogonal to said bottom panel;
welding joints existing between adjacent panels between said bottom panel, said hooked back panel, said garbage dumpster front panel, said dumpster left panel and said dumpster right panel and thereby creating a dumpster, and configured to be lifted and be dumped into a truck, by an apparatus on said truck.

16. The method of claim 15 wherein each of said bottom panel, said hooked back panel, said dumpster front panel, said dumpster left panel and said dumpster right panel comprises steel with a thickness characteristic between 14 gauge and ⅜ of an inch.

17. The method of claim 16 wherein said step of providing a package comprises purchasing said package and requested shipment of said package a distance greater than 500 miles.

18. The method of claim 15 wherein said dumpster interlocking tab comprises a dumpster interlocking tab overlapping end portion.

19. The method of claim 18 further wherein said dumpster interlocking tab overlapping end portion has a differential separation from a planar portion of a panel disposed adjacent thereto.

20. The method of claim 15 further comprising the steps of:
using a human for welding during both making and maintaining said dumpster.

* * * * *